United States Patent [19]
Batni et al.

[11] Patent Number: 5,898,917
[45] Date of Patent: Apr. 27, 1999

[54] SYSTEM FOR PROVIDING ENHANCED SERVICES IN CELLULAR RADIO TELECOMMUNICATION SYSTEMS USING #CCSC BASED TRIGGERS

[75] Inventors: Ramachendra Prahlada Batni; Axel Michael Christiansen, both of Phoenix, Ariz.

[73] Assignee: AG Communication Systems Corporation, Phoenix, Ariz.

[21] Appl. No.: 08/709,201

[22] Filed: Aug. 27, 1996

[51] Int. Cl.[6] .............................. H04M 11/00; H04M 3/42
[52] U.S. Cl. ........................ 455/564; 455/414; 455/445; 379/216
[58] Field of Search ..................................... 455/422, 414, 455/432, 433, 436, 445, 461, 466, 404, 564; 379/220, 201, 207, 45, 216

[56] References Cited

U.S. PATENT DOCUMENTS

| | | | |
|---|---|---|---|
| 5,272,748 | 12/1993 | Davis ........................................ | 379/63 |
| 5,377,186 | 12/1994 | Wegner et al. ........................... | 370/62 |
| 5,469,496 | 11/1995 | Emery et al. ............................. | 379/58 |
| 5,588,042 | 12/1996 | Comer ....................................... | 379/59 |

OTHER PUBLICATIONS

B. Hirschman, "Review of Trigger Types and Precedences," TIA/EIA TR–45.2 Intersystem Operations, Wireless Intelligent Network Task Group, Aug. 20, 1996, p. 10, Section D.2.3.4.5.

*Primary Examiner*—Paul Loomis
*Assistant Examiner*—Senai Kibreab
*Attorney, Agent, or Firm*—Gregory G. Hendricks; David J. Zwick

[57] ABSTRACT

Enhanced services are accessed from an enhanced services network element of a cellular radio telecommunications system using a cellular carrier specific code (#CCSC) string based office-level trigger and IS-41 messaging protocol message types. The invention takes advantage of the #CCSC standard to define MSC office-based trigger criteria wherein the dialed digits must start with the "#" character. When a call is received by the MSC in which the digits dialed start with "#" followed by a digit sequence, and an office-based trigger is provisioned for the "#" sequence dialed, the MSC suspends call processing and a service query message is generated and sent to the SCP of the requested enhanced service. The SCP then sends a response message back to the MSC, which resumes call processing in accordance with the response from the SCP.

5 Claims, 3 Drawing Sheets

SYSTEM FOR PROVIDING ENHANCED SERVICES IN CELLULAR RADIO TELECOMMUNICATION SYSTEMS USING #CCSC BASED TRIGGERS

FIELD OF THE INVENTION

The present invention relates to cellular radio telecommunication systems, and more particularly to a cellular radio telecommunications system wherein enhanced services are accessed from an enhanced services network element using cellular carrier specific code (#CCSC) string based office-level triggers and IS-41 messaging protocol message types.

BACKGROUND OF THE INVENTION

The ability to deliver enhanced subscriber services from an Advanced Intelligent Network (AIN) on land-line telecommunication systems is well established. These services typically involve executing service logic on an external platform, which may include, for example, accessing a database that resides on another network element external to the local switch and retrieving call processing information. Examples of such services include 800 Services, Credit Card Verification, Geographic Call Routing, Flexible Call Routing, Flexible Carrier Selection, CLASS Services, and Single Number Service.

One system for delivering enhanced subscriber services using an AIN is described in U.S. Pat. No. 5,377,186 to Wegner, et al. The system uses a Local Switch (LS) connected through an AIN to a Service Control Point (SCP) wherein a subscriber services database resides. The LS is provisioned for Integrated Services Digital Network User Part (ISUP) call-setup protocol. A number of loop-back trunks with defined Circuit Identification Code (CIC) pairs are also provisioned on the LS. In addition, the routing table in the LS is modified to route the ISUP messages for calls requesting the enhanced subscriber service to the SCP, and to route the voice signal to the outbound connection of one of the loop-back trunks. The SCP is modified so that an ISUP interface will perform AIN-type services, e.g., number translation, using parameters in the ISUP call-setup protocol that were originally intended for conditions such as call forwarding. When a call requesting the enhanced user service is received by the LS, an ISUP Initial Address Message (IAM) is routed to the SCP and voice is directed to the CIC of the outbound connection of a loop-back trunk. When the SCP receives the IAM message, the ISUP interface treats the IAM message as a Query message requesting retrieval of a subscriber service. The SCP responds to the query and returns a new routing number, or translated destination, for the call. The ISUP interface generates an IAM (Call-Forward) message that includes the new routing number and the CIC of the inbound connection of the loop-back trunk. The IAM (Call-Forward) message is then sent back to the originating MSC directing the MSC to initiate a new call to the translated destination, thus connecting the original call to the translated destination via the loop-back trunk.

The invention described in the patent to Wegner, et al., may generally be applied to cellular radio telecommunication systems by incorporating the suggested changes to the LS into a Mobile Switching Center (MSC) of a cellular system that includes an AIN.

One problem with the ISUP approach described above, as generally applied to a cellular systems, is that many MSCs in North America do not support ISUP call set-up protocol, and as such can't use this method. Another problem is that the ISUP approach requires hard-wiring one or more loop-back trunks in the MSC, and associating these trunks with a single SCP through routing table entries. This requires permanently tying up valuable resources in the form of loop-back trunks. This also requires that periodic traffic studies be completed in order to balance the expense of dedicating the loop-back trunks to an SCP against an acceptable grade of service. Another problem is that the ISUP method is directed only to enhanced subscriber services of the destination translation type and does not allow enhanced services that require suspension of call processing.

Accordingly, it is an object of the present invention to describe a system that can utilize the IS-41 messaging protocol, which is the protocol that is typically provisioned on all MSCs.

Another object of the invention is to describe a system that uses resources only as needed.

Another object of the invention is to describe a system that is flexible enough to be applied to any enhanced service, including those where an SCP interacts with a user call in a triggered environment that may include suspension of call processing.

SUMMARY OF THE INVENTION

The present invention is a system for providing enhanced services in a cellular radio telecommunication system through the provisioning of one or more office-based triggers in an MSC. The invention takes advantage of the cellular carrier specific code (#CCSC) standard to define MSC trigger criteria wherein the dialed digits must start with the "#" character. When a call is received by the MSC in which the digits dialed start with "#" followed by a digit sequence, and an office-based trigger is provisioned for the "#" sequence dialed, the MSC suspends call processing and a service query message is generated and sent to the Service Control Point (SCP) of the requested enhanced service. The SCP then sends a response message back to the MSC, which resumes call processing in accordance with the response from the SCP.

DESCRIPTION OF THE PREFERRED EMBODIMENT

The inventive concepts of the present invention are illustrated in a preferred embodiment of a cellular radio telecommunications system that defines an enhanced service, accessed from a cellular phone by dialing #123, wherein an SCP provides call routing information to complete the call. Such a system could be employed, for example, to direct a call to the pizzeria nearest the caller's home address when a call is placed to a central number to order a pizza.

Figure 1:
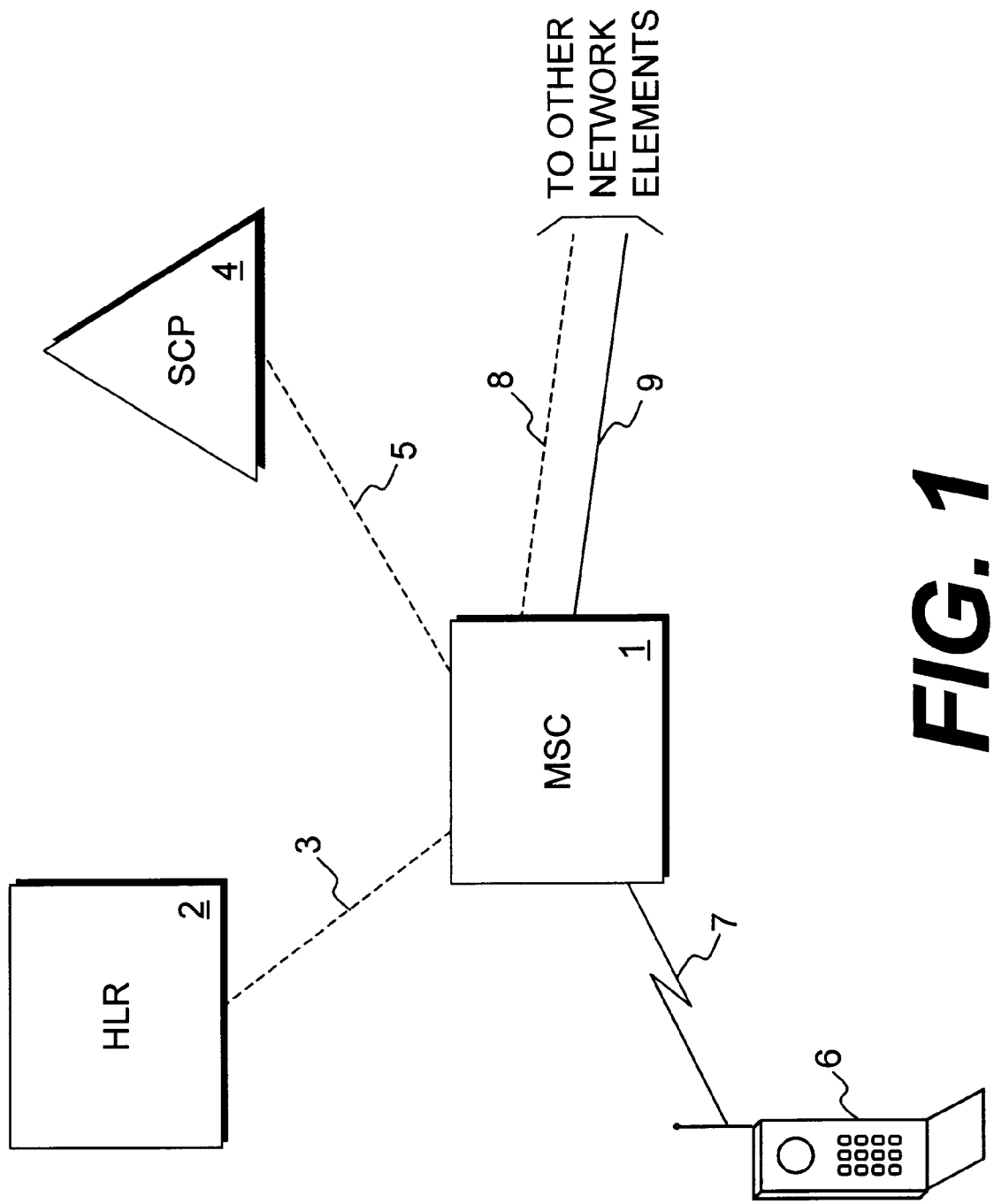
FIG. 1 is a simplified block diagram of the preferred embodiment of a cellular radio telecommunications system that provides enhanced services from an SCP.

FIG. 1 shows a simplified block diagram of the preferred embodiment of a system that provides enhanced services from an SCP wherein an MSC and an SCP are modified according to the teachings of the present invention. MSC 1 is connected to Home Location Register (HLR) 2 over Signaling Network (SN) link 3. MSC 1 is further connected to SCP 4 over SN link 5, and to other network elements over SN link 8 and Multi-Frequency (MF) link 9. Mobile Station (MS) 6, for example a cellular telephone, communicates with MSC 1 over radiotelecommunications link 7.

Communications over SN links 3, 5 and 8 take place over high-speed telecommunication links. These links can carry signaling traffic using both the SS7 signaling protocol and the X.25 signaling protocol. The SS7 signaling protocol is described in Bellcore standard "GR-606-CORE LSSGR Common Channel Signaling, Section 6.5, " Issue 1, Rev. 2, Bellcore, December 1995 and ANSI standards "ANSI T1.110-1992 Signaling System No. 7 (SS7) General Information," American National Standards Institute (ANSI), 1992; "ANSI T1,111-1992 Signaling System No. 7 (SS7) Message Transfer Part," ANSI, 1992; "ANSI T1,112-1992 Signaling System No. 7 (SS7) Signaling Connection Control Part," ANSI, 1992; the X.25 signaling protocol is described in International Telecommunications Union (ITU) standard "ITU-T Recomendation X.25 Interface Between Data Terminal Equipment (DTE) and Data Circuit-Terminating Equipment (DCE) for Terminals Operating in the Packet Mode and Connected to Public Data Networks by Dedicated Circuit," ITU, March 1993, which are all hereby incorporated by reference. Communications between MSC 1 and other network elements over link 9 take place over the Public Switching Telephone Network (PSTN) using multi-frequency links. Per convention, links in the figures herein that are indicated by dashed lines use the SN, and links indicated by solid lines use the MF network.

Links 3, 5, 8, and 9 represent logical links between the network elements shown and may comprise, and share in part or in whole, a combination of one or more physical links, including wireline, fiber, coax or microwave connections. Although not explicitly shown, SN links 3, 5 and 8, and MF link 9 may include network switching elements, such as Service Switching Points, Tandem Switches, and Signal Transfer Points.

Communications between MS 6 and MSC 1 take place over a radiotelecommunications link 7 using any of the air interface standards defined by Telecommunications Industry Association/Electronic Industries Association (TIA/EIA) standards bodies.

The procedures necessary to provide common cellular services requiring interaction between different cellular systems, including message types and the parameters therein, are described in Telecommunications Industry Association (TIA) standard "TIA/EIA IS-41.1-C Cellular Radio-telecommunications Intersystem Operations: Functional Overview," TIA, February 1996 and the other standards in the series: IS-41.2-C Intersystem Handoff Information Flows; IS-41.3-C Automatic Roaming Information Flows; IS-41.4-C Operations, Administration, and Maintenance Information Flows and Procedures; IS-41.5-C Signaling Protocols; and IS-41.6-C Signaling Procedures, each published by TIA, February 1996, hereinafter referred to collectively as TIA/EIA IS-41-C, which are hereby incorporated by reference.

To those skilled in the art of the present invention, the operation of the SN and PSTN networks, the network elements used therein, and IS-41 messaging protocol are well known.

MSC 1 is an automatic switching system in a cellular radio telecommunications network that acts as the interface for subscriber traffic between the serving cellular network and other public switched networks or other MSCs in the same or other cellular networks. An MSC performs the same general function as a central office switch in a land-line-based system. The main difference between an MSC and a central office switch is that an MSC also provides for incoming calls through a radio telecommunications front-end.

MSC 1 of the present invention takes advantage of Section 5.16 Cellular Carrier Specific Code: #CCSC of TIA standard "TIA/EIA/IS-52-A Uniform Dialing Procedures and Call Processing Treatment for use in Cellular Radio Telecommunications," Telecommuications Industry Association, 1995 which is hereby incorporated by reference, which states that when a mobile subscriber dials a digit sequence beginning with the "#" character, for example "#123" , the serving cellular carrier may process the call in any manner the carrier sees fit.

MSC 1 is modified to allow provisioning of a set of up to 1,000 office-based triggers of the form "#XXX" where "X" represents any single numerical digit. A trigger includes a detection point that specifies where in the call processing the triggering event is to be detected, criteria that define what conditions must be satisfied for the trigger to notify the MSC that the triggering event has occurred, and logic that defines what action the trigger will take when the triggering event occurs. Trigger logic can include call suspension. In the preferred embodiment, a trigger is provisioned with the detection point at the "collect digits" point in the call. The criteria state that the dialed digits must start with "#123." When the trigger criteria are satisfied, the trigger logic suspends call processing, generates a service query message that includes the entire digits dialed sequence, sends the service query message to the SCP that handles the #123 enhanced service, and upon receiving a response message from the SCP that includes call routing information, resumes call processing and routes the call as indicated in the response message. Description and operation of a trigger in an Intelligent Network environment is described in ITU standard "ITU-T Recommendation Q.1214 General Recommendations on Telephone Switching and Signaling-Intelligent Network," ITU, March 1993 which is hereby incorporated by reference.

Each desired #XXX trigger is separately provisioned in MSC 1. For each provisioned #XXX trigger, a translation table is established with the Destination Point Code of the SCP to which a #XXX service query message will be sent by MSC 1 when the trigger is encountered and the criteria is satisfied. Direct Point Code addressing is described in T1.110-1992. Although the specific implementation and modifications required for an MSC will be dependent on the make and model of the switch, these modifications can be carried out by design engineers familiar with the architecture of the specific switch without undue experimentation.

As described in TIA/EIA-IS-41-C, subscriber-based triggers (OriginationTriggers) may also be defined that trigger on the "#" character. Subscriber-based triggers always have precedence over office-based triggers. Thus, if a mobile subscriber sends a digit sequence beginning with "#" and both an office-based trigger for the digit sequence and a subscriber-based "#" trigger are set, then the subscriber-based "#" trigger will be processed first. This may cause the lower priority office-based trigger to be bypassed.

The preferred embodiment of the present invention uses the IS-41 OriginationRequest (ORREQ) record type, as described in TIA/EIA-IS-41-C, for the service query message from MSC 1 to SCP 4, and also as the query response message from SCP 4 back to MSC 1. By convention, messages originating from MSC 1 are designated in capital letters, e.g., "ORREQ", and messages sent to MSC 1 are designated by lower case letters, e.g., "orreq". Any IS-41 record type, as described in TIA/EIA-IS-41 -C, or a user defined record layout, that contains the parameters required by SCP 4 to perform the enhanced service and the parameters required by MSC 1 to continue call processing can be used. An IS-41 record type was chosen for the preferred embodiment because IS-41 record layouts are standardized and easily accessible, and more particularly, the ORREQ record type was chosen because all required parameters for the #123 enhanced service of the preferred embodiment are contained in this record type.

An HLR is a location register to which the user identity of an MS is assigned for record purposes such as subscriber information, for example, profile information, current location, and authorization period. When an MSC detects an MS entering the MSC's service area, for example by turning on a cellular phone or by transporting a cellular phone into the service area of an MSC, the MSC performs a registration process that includes requesting subscriber profile information from the HLR of the MS. An HLR may, or may not, be located within and be indistinguishable from an MSC, and may be distributed over more than one physical entity. An HLR may also serve more than one MSC.

HLR 2 of the preferred embodiment is the HLR of the subscriber that is accessing the #123 enhanced service. HLR 2 is a separate network element from MSC 1 and is accessed from MSC 1 over SN link 3. Subscriber-based trigger information, as discussed above, is part of the profile information stored in the HLR on a per subscriber basis.

An SCP is an AIN network element that contains the logic and data used to provide enhanced services. An SCP receives service queries from other network elements, and responds to the query in a manner appropriate to the query in the context of the enhanced service. An SCP can receive service queries from any other network element, including other SCPs. Operation of an AIN is described in Bellcore standard "TR-NWT-001284 Advanced Intelligent Network (AIN) 0.1 Switching System Generic Requirements, Bellcore, March 1993";SCP operation is described in Bellcore standard "GR-1280-CORE Advanced Intelligent Network (AIN) Service Control Point (SCP) Generic Requirements," Bellcore, August 1993, which are all hereby incorporated by reference.

SCP 4 of the present invention is provisioned for both SS7 and X.25 signaling protocols, and contains logic to process incoming ORREQ query messages from MSC 1 and to generate and transmit IS-41 orreq response messages back to MSC I with appropriate call routing information.

Figure 2A:
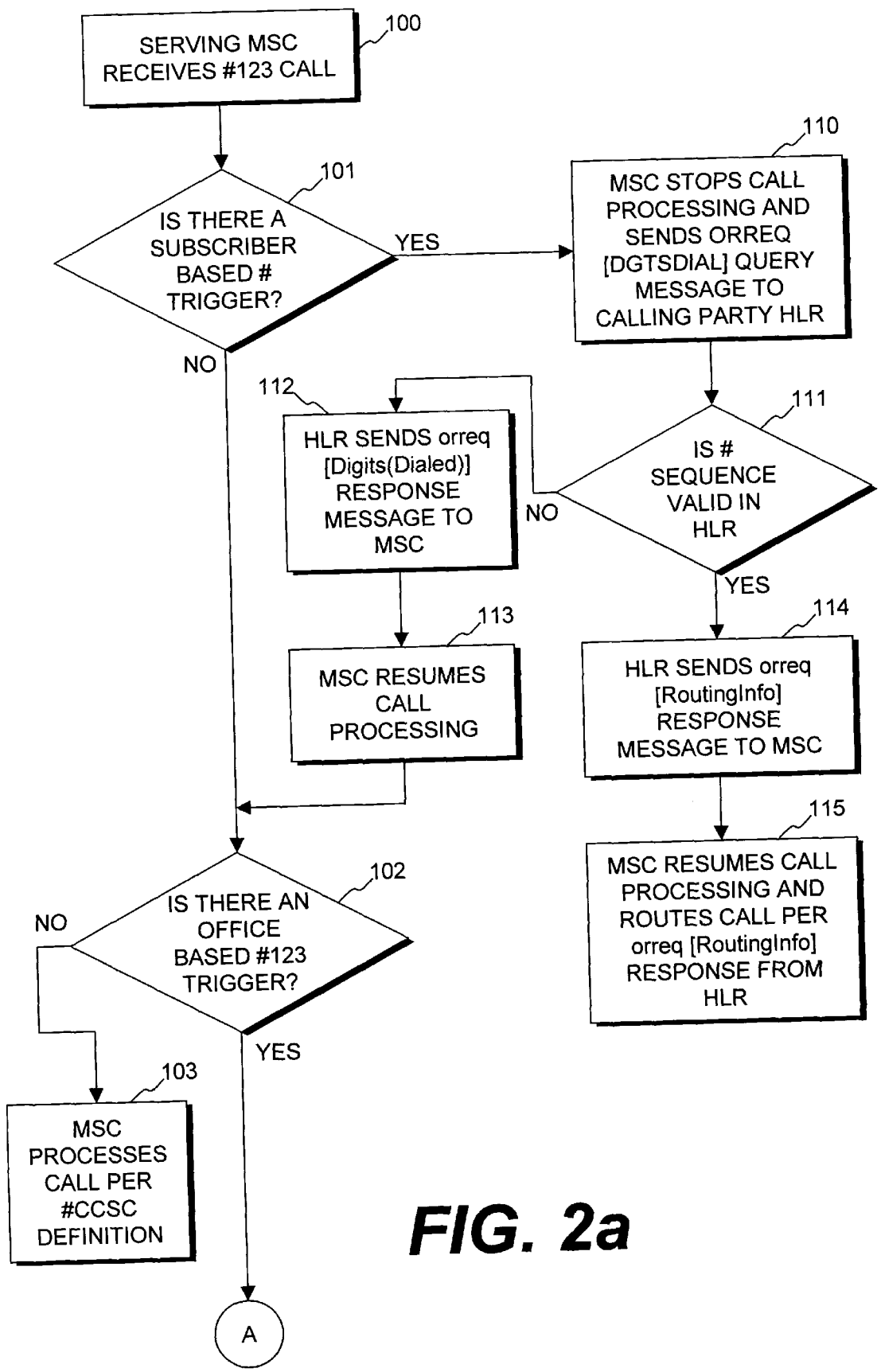
FIGS. 2 are a flow chart of the message flow and call processing of the preferred embodiment of a cellular radio telecommunications system that provides enhanced services from a SCP using a #123 trigger.
Figure 2B:
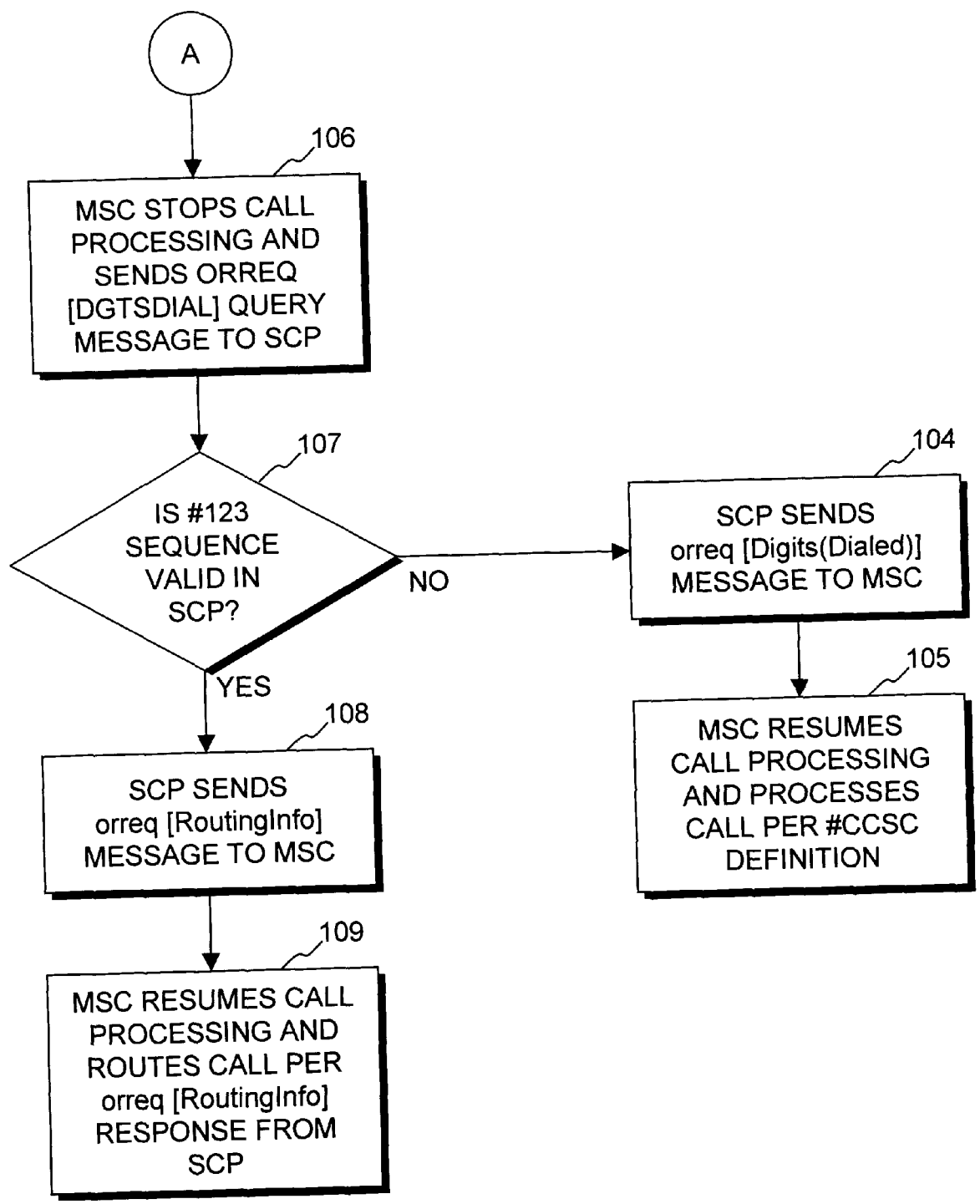

FIGS. 2 illustrates the inventive concepts of the preferred embodiment in a flow chart showing typical system operation for the #123 enhanced service. At step 100, MSC 1 receives a #123 call. The received call consists of the digits #123 and can be followed by one or more optional digits. The call can be originated from MS 6, or MSC 1 can receive the call over MF link 9 and SN link 8 from another MSC in the same cellular system or from another cellular or wireline-based system.

At step 101, MSC 1 examines the subscriber information received from HLR 2 at registration to determine if the subscriber-based "#" trigger is set. If the subscriber-based "#" trigger is not set, processing moves to step 102.

If at step 101, it is determined that the subscriber-based "#" trigger is set, then at step 110, MSC 1 stops call processing and sends an ORREQ [DGTSDIAL] query message to HLR 2 over SN link 3.

At step 111, HLR 2 performs a table lookup to determine if the subscriber has a routing entry for the #123 sequence dialed by the subscriber. If the subscriber has a routing entry for the dialed sequence, then at step 114, HLR 2 sends an orreq [RoutingInfo] response message to MSC 1 over SN link 3. At step 115, MSC 1 resumes call processing and routes the subscriber #123 call per routing instructions received from HLR 2 in the orreq response message.

In the situation just described where there is a subscriber-based "#" trigger set and the subscriber has a routing entry for the #123 sequence dialed, processing flows to step 115 where MSC 1 routes the call per the HLR 2 routing entry whereupon a call is established. As illustrated, this process flow will bypass the lower priority #123 office-based trigger of the present invention.

If at step 111, it is determined that the subscriber does not have a routing entry for the #123 sequence dialed, then at step 112, HLR 2 sends an orreq [Digits(Dialed)] response message back to MSC 1 over SN link 3. The orreq message includes the original digits dialed, indicating that MSC 1 should continue digit translation. Then at step 113, MSC 1 resumes call processing of the subscriber's #123 call and moves to step 102.

At step 102, MSC 1 performs a look-up in the translation table associated with the #XXX office-based triggers of the present invention to determine if there is an office-based #123 trigger provisioned. If there is no office-based #123 trigger provisioned, then the dialed sequence is invalid and at step 103 the call is processed per the #CCSC definition of MSC 1. The #CCSC definition for handling an invalid call could include, for example, sending a message indicating that an invalid number was dialed followed by call disconnect.

If at step 102, a look-up in the translation table determines that there is a office-based #123 trigger provisioned in MSC 1, then at step 106 MSC 1 stops call processing and sends an ORREQ[DGTSDIAL] service query message to SCP 4 over SN link 5. The network address to which to send the ORREQ query message is contained in the #123 translation table entry.

At step 107, SCP 4 determines if the #123 sequence dialed by the subscriber is valid in the context of the enhanced service residing on SCP 4. If the #123 sequence dialed by the subscriber is not valid, then at step 104 SCP 4 sends an orreq[Digits(Dialed)] response message back to MSC 1 over SN link 5, indicating that MSC 1 should continue digit translation. Then at step 105, MSC 1 resumes call processing and processes the call per the #CCSC definition for handling invalid #CCSC calls.

If at step 107, SCP 4 determines that the #123 sequence dialed by the subscriber is valid, then at step 108 SCP 4 sends an orreq [RoutingInfo] response message to MSC 1 over SN link 5. Then at step 109, MSC 1 resumes call processing and routes the subscriber #123 call per routing instructions received from SCP 4 in the orreq response message.

Alternative embodiments of the present invention may include, but are not limited to, one or more of the following. MSC 1 may be provisioned for #CCSC office-based triggers in which the trigger criteria is defined for any predetermined number of digits including the "#" and "*" characters following the initial "#". In the preferred embodiment, MSC 1 and SCP 4 communicate using the SS7 or X.25 signaling protocols, however MSC 1 and SCP 4 can be provisioned to communicate using any defined signaling and messaging protocols. In the preferred embodiment, MS 6 is a cellular telephone, however other radiotelecommunications devices can serve to place a call requesting enhanced services from MSC 1, including personal computers or Personal Digital Assistants (PDAs). In the preferred embodiment, the #123 enhanced service is of the call redirection type, however SCP 4 may be provisioned with enhanced services other than those of this type, for example, Credit Card Calling. In the preferred embodiment, the enhanced service resides on an SCP, however the enhanced service may be provisioned on an addressable network element other than an SCP.

While the inventive system has been particularly shown and described, it is not intended to be exhaustive nor to limit the invention to the embodiment disclosed. It will be apparent to those skilled in the art that modifications can be made to the present invention without departing from the scope and spirit thereof. It is intended that the scope of the invention be defined by the claims appended hereto and their equivalents.

What is claimed is:

1. A system for providing enhanced services to users of a cellular radio telecommunications system having a mobile switching center, a mobile subscriber connected to said mobile switching center and operated to generate and transmit to said mobile switching center a first "#" sequence of a first characteristic and a second "#" sequence of a second characteristic, a home location register connected to said mobile switching center and containing subscriber profile information that is transmitted to said mobile switching center, an enhanced service network element connected to said mobile switching center, said system for providing enhanced services comprising:

program logic resident on said mobile switching center, said program logic defining an office-based trigger that includes criteria wherein it is specified that the received digit sequence must start with the "#" character and match a predetermined sequence of digits;

said program logic being further operated in response to receiving said first "#" sequence to determine that said mobile subscriber does not have a subscriber-based "#" trigger defined, then determining that said mobile switching center is provisioned with said office-based trigger wherein said first "#" sequence satisfies said criteria, then processing said office-based trigger; and said program logic being operated in response to receiving said second "#" sequence to determine that said mobile subscriber has a subscriber-based "#" trigger defined, then processing said subscriber-based trigger, then determining that said mobile switching center is provisioned with said office-based trigger wherein said second "#" sequence satisfies said criteria, then processing said office-based trigger.

2. A system for providing enhanced services to users of a cellular radio telecommunications system according to claim 1, wherein said program logic is further operated to send messages back and forth from said mobile switching center to said enhanced service network element.

3. A system for providing enhanced services to users of a cellular radio telecommunications system according to claim 2, wherein said messages utilize IS-41 messaging protocol.

4. A method of providing enhanced services to users of a cellular radio telecommunications system including a plurality of mobile stations each being a source of a transmitted digit character string having an initial "#" character, a mobile switching center, a home location register being a source of a plurality of subscriber profiles, each associated with a corresponding mobile station, each of said profiles including a subscriber "#" trigger indicator, at least one of said subscriber "#" trigger indicators indicating that said associated mobile station has an associated subscriber "#" trigger, said home location register further including said associated subscriber "#" trigger, said subscriber "#" trigger including an associated first predetermined digit string, said system further including an enhanced service network element, said method comprising the steps of:

provisioning said mobile switching center to include at least one office-based "#" trigger including an associated second predetermined digit string;

receiving said subscriber profiles at said mobile switching center;

receiving one of said transmitted digit strings at said mobile switching center;

determining at said mobile switching center in response to said received digit string whether said associated subscriber "#" trigger indicator indicates that said associated mobile station has an associated subscriber "#" trigger;

sending said received digit string from said mobile switching center to said home location register if said associated subscriber "#" trigger indicator indicates that said associated mobile station has an associated subscriber "9" trigger;

determining at said home location register whether or not said received digit string corresponds to said first predetermined digit string;

sending said received digit string from said home location register to said mobile switching center if said received digit string does not correspond to said first predetermined digit string;

determining at said mobile switching center whether or not said received digit string corresponds to said second predetermined digit string;

performing a first predetermined call processing operation sequence if said received digit string does not correspond to said second predetermined digit string;

suspending call processing if said received digit string corresponds to said second predetermined digit string;

sending said received digit string from said mobile switching center to said enhanced service network element;

sending a response message from said enhanced service network element to said mobile switching center; and performing in response to said received response message a second predetermined call processing operation sequence at said mobile switching center.

5. The method of claim 4, wherein information sent back and forth between said enhanced network service element and said mobile switching center utilizes IS-41 messaging protocol.

* * * * *